(12) United States Patent
Reimker et al.

(10) Patent No.: US 12,528,460 B2
(45) Date of Patent: Jan. 20, 2026

(54) CONTROLLING A MOTOR VEHICLE AT PARTIAL FIELD-OF-VIEW CONCEALMENT

(71) Applicant: AUDI AG, Ingolstadt (DE)

(72) Inventors: Christian Reimker, Braunschweig (DE); Christian Reinl, Pollenfeld (DE); Anna Rehr, Freising (DE); Simon Grossjohann, Wolfsburg (DE); Toni Guenther, Braunschweig (DE); Rajko Petelka, Hemkenrode (DE)

(73) Assignee: AUDI AG, Ingolstadt (DE)

( * ) Notice: Subject to any disclaimer, the term of this patent is extended or adjusted under 35 U.S.C. 154(b) by 327 days.

(21) Appl. No.: 18/252,652

(22) PCT Filed: Nov. 12, 2021

(86) PCT No.: PCT/EP2021/081451
§ 371 (c)(1),
(2) Date: May 11, 2023

(87) PCT Pub. No.: WO2022/101372
PCT Pub. Date: May 19, 2022

(65) Prior Publication Data
US 2024/0010194 A1    Jan. 11, 2024

(30) Foreign Application Priority Data

Nov. 13, 2020 (DE) .................. 10 2020 130 069.7

(51) Int. Cl.
*B60W 30/095*    (2012.01)
(52) U.S. Cl.
CPC ..... *B60W 30/095* (2013.01); *B60W 2420/403* (2013.01); *B60W 2420/408* (2024.01);
(Continued)

(58) Field of Classification Search
CPC ......... B60W 30/095; B60W 2420/403; B60W 2420/408; B60W 2420/54;
(Continued)

(56) References Cited

U.S. PATENT DOCUMENTS 8,620,488 B2 * 12/2013 Johansson ............. B60W 40/06
                                                    701/1
10,395,332 B1 * 8/2019 Konrardy ............. G01S 5/0027
(Continued)

FOREIGN PATENT DOCUMENTS

DE    11 2018 004 561 T5    6/2020
DE    11 2012 006 032 B4    10/2021
WO    WO 2020/164867 A1    8/2020

OTHER PUBLICATIONS

English Translation of IPRP (PCT/IB/338 and PCT/IB/373) (May 25, 2023) and the Written Opinion of ISA (PCT/ISA/237) issued in International Application No. PCT/EP2021/081451 dated Mar. 1, 2022 (7 pages).
(Continued)

*Primary Examiner* — Mussa A Shaawat
(74) *Attorney, Agent, or Firm* — STAAS & HALSEY LLP (57) ABSTRACT

A method of automatically controlling a motor vehicle may involve generating environment data and the data being taken as a basis for determining a concealed region of a field of view. A reference point on a boundary between the concealed region and an unconcealed region of the field of view is determined, and at least two risk zones, each risk zone having the reference point as the centre, may be determined. A risk zone of the risk zones (Sa, Sb, Sc) may be assigned a risk characteristic, and the motor vehicle may be controlled on the basis of the risk characteristics.

15 Claims, 6 Drawing Sheets

(52) U.S. Cl.
CPC ..... *B60W 2420/54* (2013.01); *B60W 2520/10* (2013.01); *B60W 2556/40* (2020.02); *B60W 2720/10* (2013.01)

(58) Field of Classification Search
CPC ......... B60W 2520/10; B60W 2556/40; B60W 2720/10; B60W 60/0015; B60W 2554/00; B60W 2554/20; G05D 1/0246; G05D 1/0214; G06V 20/58; G08G 1/166; G08G 1/167
See application file for complete search history.

(56) References Cited

U.S. PATENT DOCUMENTS

| | | | | |
|---|---|---|---|---|
| 10,946,833 | B2* | 3/2021 | Kong | B60R 25/24 |
| 11,308,808 | B2* | 4/2022 | Klawitter | G08G 1/0141 |
| 2014/0046506 | A1* | 2/2014 | Reichel | B62D 15/0285 |
| | | | | 701/2 |
| 2015/0066284 | A1* | 3/2015 | Yopp | B60K 28/06 |
| | | | | 701/29.2 |
| 2018/0058878 | A1* | 3/2018 | Roth | G08G 1/096827 |
| 2019/0025816 | A1* | 1/2019 | Vogt | G05D 1/0212 |
| 2019/0310657 | A1* | 10/2019 | Badouin | G08B 27/00 |
| 2019/0384302 | A1 | 12/2019 | Silva et al. | |
| 2020/0103523 | A1 | 4/2020 | Liu et al. | |
| 2020/0130685 | A1* | 4/2020 | Nguyen | B60W 60/001 |
| 2020/0278681 | A1 | 9/2020 | Gier et al. | |
| 2022/0065653 | A1* | 3/2022 | Kim | G01S 13/931 |
| 2023/0011454 | A1* | 1/2023 | Salomon | G01S 15/08 |
| 2023/0030503 | A1* | 2/2023 | Bang | B60W 30/0956 |
| 2023/0118619 | A1* | 4/2023 | Horihata | G08G 1/0141 |
| | | | | 340/937 |

OTHER PUBLICATIONS

International Search Report issued in International Application No. PCT/EP2021/081451 dated Jan. 3, 2022.
Written Opinion issued in International Application No. PCT/EP2021/081451 dated Jan. 3, 2022.

* cited by examiner

CONTROLLING A MOTOR VEHICLE AT PARTIAL FIELD-OF-VIEW CONCEALMENT

CROSS-REFERENCE TO RELATED APPLICATIONS

This application is a U.S. national stage of International Application No. PCT/EP2021/081451, filed on Nov. 12, 2021, which claims the priority benefit of German Application No. 10 2020 130 069.7 filed on Nov. 13, 2020. Both the International Application and the German Application are incorporated by reference herein in their entirety.

BACKGROUND

1. Field

The described examples of an invention may relate to a method for at least partially automatic control of a motor vehicle, wherein environmental data may be generated by an environmental sensor system of the motor vehicle, which represents surroundings of the motor vehicle, and a region of a field of view of the environmental sensor system concealed by at least one concealing object may be determined based on the environmental data by a computing unit. Further, the examples relate to a corresponding electronic vehicle guidance system, to a motor vehicle and to a computer program product.

2. Description of the Related Art

In known approaches for at least partially automatic control of a motor vehicle, objects in the vehicle surroundings can be taken into account. Therein, various sensor technologies are employed in different positions of the vehicle for environmental perception. The used sensors are for example based on acoustic or optical methods, in which waves for detecting objects propagate in a defined field of view. If an object appears in this field of view, thus, it can be captured and correspondingly be taken into account.

However, such objects in the field of view imply regions of the field of view concealed behind the objects, which occupy more or less large portions of the field of view according to type of the concealing object. Especially in parking surroundings, significant concealments can occur. In such situations, it can occur that a human or a further vehicle behind the concealing object, for example a wall, is only lately recognized by the ego vehicle. In the at least partially automatic control, the ego vehicle is correspondingly driven very slowly. Therefore, significant delays in the driving and correspondingly a reduced degree of comfort for a user or driver of the ego vehicle occur.

In the document US 2018/0118144 A1, an apparatus for concealment control for a vehicle is described. If a sufficiently large blind region is identified, the vehicle is decelerated from a normal speed to standstill. Alternatively, the route planning can be adapted to reduce the size of the blind region.

Here too, very severe restrictions in the control of the vehicle occur up to the standstill and corresponding restrictions in the degree of comfort.

SUMMARY

Against this background, according to an example, an improved concept for at least partially automatic control of a motor vehicle may be provided, by which the at least partially automatic control of a motor vehicle can react to a partially concealed field of view of an environmental sensor system of the motor vehicle, wherein the impairments of the comfort for users of the motor vehicle are kept as low as possible.

Herein, examples may be recited by the respective subject matter of the independent claims. Advantageous developments and examples may also be the subject matter of the dependent claims.

In an example, the potential risk, which originates from the concealed region of the field of view, may be quantified in that at least two risk zones with corresponding characteristic risk values may be determined and the motor vehicle may be controlled depending on the characteristic risk values.

According to an example, a method for at least partially automatic control of a motor vehicle is provided. By an environmental sensor system of the motor vehicle, environmental data may be generated, which represents or images surroundings of the motor vehicle. By a computing unit, for example, a computing unit of the motor vehicle, a region of a field of view of the environmental sensor system concealed by at least one concealing object may be determined based on the environmental data. By the computing unit, a reference point on a boundary between the concealed region and an unconcealed region of the field of view may be determined and at least two risk zones, for example, concentric risk zones, with each reference point as the center of the at least two risk zones may be determined. Therein, a characteristic risk value may be assigned to each of the at least two risk zones, for example, by the computing unit. The motor vehicle is at least partially automatically controlled depending on the characteristic risk values, which may have been assigned to the at least two risk zones, for example, by an electronic vehicle guidance system of the motor vehicle, which for example may include the computing unit.

Here and in the following, an environmental sensor system can be understood as a sensor system, which may be capable of generating sensor data or sensor signals, which may depict, represent or reproduce the surroundings of the environmental sensor system and of the motor vehicle, respectively. For example, camera systems, radar systems, lidar systems or ultrasonic sensor systems can be understood as environmental sensor systems.

The concealed region of the field of view may, for example, be a region not recognizable for the environmental sensor system, thus, objects, which can be located within the concealed region, cannot be captured by the environmental sensor system.

The determination of the concealed region, for example, may include capturing or identifying the at least one concealing object and the position and extension of the at least one concealing object, respectively. The at least one concealing object can for example include a building, a wall, a house, a partition or a further motor vehicle. Partial regions of the field of view, which are located behind the at least one concealing object viewed from the sensor system, cannot be captured by the environmental sensor system and are therefore a part of the concealed region. Therein, the computing unit can for example apply geometric models, for example ray models, to determine and parametrize, respectively, or define the concealed region.

The reference point for example may correspond to a point on the boundary, at which a possibly concealed object can transition out of the concealed region into the unconcealed region. A potential collision between the motor vehicle and the concealed object could accordingly occur in the vicinity of the reference point.

The at least two risk zones can contact each other, but do not overlap each other. The at least two risk zones can for example correspond to concentric circles or circular rings, wherein a first risk zone of the at least two risk zones corresponds to a circle with the reference point as the circle central point and a second risk zone of the at least two risk zones corresponds to a circular ring, which externally adjoins to the first risk zone. Further risk zones can then also be configured as circular rings adjoining to the second risk zone and so on. Therein, the central points of the circular rings as well as of the circle each correspond to the reference point.

Analogously, the first risk zone can be configured as an ellipse with the reference point as the central point and the second and the further risk zones, respectively, can be configured as corresponding elliptical rings with the reference point as the central point. In an example, the first risk zone is configured as a polygon, for example as a regular polygon or as a rectangle, for example as a square or as a regular hexagon, and the second and the further risk zones, respectively, are configured as corresponding polygonal rings.

Thus, the different risk zones of the at least two risk zones may differ from each other for example by a respective minimum distance from the reference point. While the first risk zone includes the reference point, the second risk zone has a finite minimum distance from the reference point and further risk zones optionally have respectively larger minimum distances from the reference point.

The characteristic risk values of the at least two risk zones can for example represent a measure of how high a probability or a risk for the collision of the motor vehicle with a concealed object in the concealed region in the corresponding risk zone is. The farther the motor vehicle is away from the boundary between the concealed region and the unconcealed region, the lower is the risk that a collision with the concealed object occurs, since a correspondingly longer period of time is available to the driver of the motor vehicle or the electronic vehicle guidance system to decelerate the motor vehicle to standstill or to evade in case of emergency. Therein, the characteristic risk values of the at least two risk zones may be different from each other, for example all of the characteristic risk values of the different risk zones of the at least two risk zones may be different from each other.

By considering the characteristic risk values of the at least two risk zones in the automatic or partially automatic control of the motor vehicle, it becomes possible to perform a graduated control or drive planning for the motor vehicle such that the intervention in the control and the influence of the concealed region on the control of the motor vehicle depending on the characteristic risk values can be more or less strong. Thereby, an excessively severe influence of the drive planning and of the actual behavior of the motor vehicle, respectively, in presence of the concealed region does not occur.

For example, the characteristic risk values can influence the partially or completely automatic selection of driving parameters, such as for example a motor vehicle speed or a maximum motor vehicle speed. If the motor vehicle is for example moved through one or more of the risk zones, thus, the planned motor vehicle speed or a maximum motor vehicle speed can be differently severely restricted according to characteristic risk value, in particular such that the restriction is the more severe, the higher the corresponding risk for the potential collision is. Alternatively or additionally, trajectories for the drive planning of the motor vehicle can become the more improbable, the longer the section of the corresponding potential trajectory through the at least two risk zones is and how the corresponding characteristic risk values are, respectively.

Here and in the following, an electronic vehicle guidance system can be understood to be an electronic vehicle guidance system, which may be configured to guide or to control the motor vehicle in fully automated or fully autonomous manner and for example without an intervention in a control by a driver being necessary. Therein, the motor vehicle or the electronic vehicle guidance system may perform all of the required functions, such as for example required steering, deceleration and/or acceleration maneuvers, the observation and capture of the road traffic as well as the required reactions associated therewith in autonomous and fully automatic manner. In particular, the electronic vehicle guidance system can serve for implementing a fully automatic or fully autonomous driving mode of the motor vehicle according to level 5 of the classification according to SAE J3016. A driver assistance system can also be understood to be an electronic vehicle guidance system, which may assist the driver in a partially automated or partially autonomous drive of the motor vehicle. In particular, the electronic vehicle guidance system can serve for implementing a partially automated or partially autonomous driving mode of the motor vehicle according to any one of levels 1 to 4 according to the SAE J3016 classification. Here and in the following, SAE J3016 refers to the corresponding standard in the version of June 2018.

Therefore, the at least partially automatic control of the motor vehicle can include guiding the motor vehicle according to a fully automatic or fully autonomous driving mode of the level 5 according to SAE J3016. The at least partially automatic control of the motor vehicle can also include guiding the motor vehicle according to a partially automated or partially autonomous driving mode according to any one of levels 1 to 4 according to SAE J3016.

According to at least one example of the method according to the described examples, the respective characteristic risk value may be assigned to each of the at least two risk zones by the computing unit depending on a respective minimum distance of the respective risk zone from the reference point.

For example, the characteristic risk value can correspond to an integer greater than or equal to 1, wherein the characteristic risk value of the first risk zone, which includes the reference point, is equal to 1, the characteristic risk value for the second risk zone is equal to 2 and so on. In an example, the characteristic risk value can be the greater, the farther the corresponding risk zone is minimally away from the reference point. Of course, other conventions for defining the characteristic risk values are also possible and all of the following explanations can be analogously transferred to such conventions.

According to at least one example, a current risk zone of the at least two risk zones may be determined by the computing unit, wherein a position of the motor vehicle may be within the current risk zone. The motor vehicle may be at least partially automatically controlled depending on the characteristic risk value assigned to the current risk zone.

The position of the motor vehicle can for example be given by a coordinate of a point, which is on or in the motor vehicle or which is in defined surroundings of the motor vehicle.

For controlling the motor vehicle depending on the characteristic risk value assigned to the current risk zone, a maximum vehicle speed for the motor vehicle can for example be set or defined depending on the corresponding characteristic risk value or, for example if the vehicle speed is automatically controlled by the vehicle guidance system, the speed of the motor vehicle can be set depending on the characteristic risk value. In particular, the higher the risk for a potential collision is, thus, the lower for example the characteristic risk value is, the lower the adjusted maximum speed or speed of the motor vehicle can be.

Thereby, the speed of the motor vehicle or the maximum speed thereof may be limited or reduced in graduated manner to thus reduce the risk of a potential collision, but not to unnecessarily severely lower the speed at the same time.

Depending on the change of the position of the motor vehicle, thus on the movement of the motor vehicle through the at least two risk zones, the position of the motor vehicle may be for example successively in different ones of the at least two risk zones. Correspondingly, the control can be adapted once or multiple times during the passage through the different risk zones by the motor vehicle, for example by changing the speed of the motor vehicle or the maximum speed, according to corresponding current risk zone and the associated characteristic risk value.

According to at least one example, the motor vehicle may be at least partially automatically controlled according to a vehicle speed or vehicle maximum speed depending on the characteristic risk value of the current risk zone, for example by the electronic vehicle guidance system.

In other words, the motor vehicle may be controlled such that the motor vehicle has at least approximately the corresponding vehicle speed or the vehicle speed may be set as a target speed or the speed of the motor vehicle may be limited to the vehicle maximum speed.

Therein, the vehicle speed or vehicle maximum speed can in particular be set by the respective minimum distance of the respective risk zone from the reference point, such that timely deceleration to standstill or evasion may be allowed if necessary, in particular considering braking distance, reaction speed or latency time.

According to at least one example, a trajectory for the motor vehicle may be planned by the computing unit depending on the at least two risk zones, and in particular depending on the corresponding characteristic risk values.

Such a trajectory planning may for example be advantageous for fully autonomously or fully automatically guided motor vehicles. Thereby, the at least two risk zones can be completely or partially bypassed. Thereby, the speed limit, as described above, can have a less severe influence on the control of the motor vehicle depending on the characteristic risk values in that the planned trajectory leads less long through the at least two risk zones or the corresponding characteristic risk values of the passed risk zones are higher, thus correspond to a low risk of collision.

According to at least one example, a cost function may be optimized by variation of potential trajectories for the motor vehicle by the computing unit to plan the trajectory. The cost function may depend on the characteristic risk values of that one of the at least two risk zones, through which the respective potential trajectory extends.

For example, that potential trajectory, which may result in an optimized cost function, can be selected as the planned trajectory. In that the cost function may depend on the characteristic risk values, higher cost can be assigned to trajectories, which extend through the at least two risk zones, than to other trajectories. The lower the respective characteristic risk value, thus correspondingly the higher the risk for a collision, the higher cost can be assigned to the respective risk zone. Thereby, the probability that the cost function may be optimized by such a trajectory, may be reduced. However, the extension through one or more of the at least two risk zones does not have to be the only influencing factor on the cost function. For example, a length of the trajectory or other properties of the trajectory can also be incorporated such that a high safety with influence on the control or the degree of comfort by the concealed region as low as possible may be realizable with a corresponding weighting of the individual contributions to the cost function.

According to at least one example, the at least two risk zones, in particular positions and/or orientations and/or extensions and/or shapes of the at least two risk zones, may be continuously or periodically adapted by the computing unit depending on a change of the position of the motor vehicle.

In other words, the risk zones may change in the course of the movement of the motor vehicle such that an optimum consideration of the current situation may always be given.

According to at least one example, the reference point may be determined as that point on the boundary, which immediately adjoins to the concealed region and therein has a minimum distance to the position of the motor vehicle.

Thereby, a particularly high extent of safety may be achieved since the motor vehicle potentially earlier reaches one of the at least two risk zones and can be correspondingly automatically or partially automatically controlled.

According to at least one example, the point on the boundary, which immediately adjoins to the concealed region and therein has the minimum distance to the motor vehicle, may be determined by the computing unit and is shifted, in particular along the boundary, depending on a preset expectable minimum extension of a potentially concealed object, for example by the at least one concealing object, to determine the reference point. In particular, the shifted point may correspond to the reference point.

In such described examples, the circumstance may be accounted for that only objects with a certain minimum extension or minimal extension are usually possible as relevant objects with respect to a collision with the motor vehicle. Accordingly, a certain part of the concealed region can be neglected in setting the at least two risk zones, even if this part cannot be captured by the environment of the environmental sensor system, to thus determine a reference point, which is farther away from the motor vehicle. Thereby, the influence on the control by the risk zones may be further reduced without significantly increasing the risk for a potential collision.

The shift also allows a better performance since a lower lateral distance of the motor vehicle to the concealed region can thereby be accepted. For example, this can be advantageous in parking surroundings or other confined surroundings if a larger distance cannot be complied with. For example, a lower lateral distance can be achieved without the risk of a collision increasing.

The shift of the point can also be adapted or changed corresponding to the movement of the motor vehicle.

According to at least one example, map information may be read from an electronic map and a respective size of the at least two risk zones may be determined depending on the map information by the computing unit.

For example, the computing unit can determine based on the map information, which types of concealed objects are potentially or probably located in the concealed region, for example if it is probable that pedestrians and/or further motor vehicles are located in the concealed region. The computing unit can determine this based on the map information for example depending on the fact if a pedestrian path, a bicycle path, a single-lane road, a two-lane road and so on is in the concealed region according to the map information.

Therein, the electronic map, which can also be referred to as digital map or high-resolution map or HD map, can be stored on a storage element of the motor vehicle or of the electronic vehicle guidance system or on an external server computing unit or a cloud computing unit.

For example, the computing unit can determine based on the map information, which course or which shape the at least one concealing object in the concealed region has. For example, a rectangular course can usually be assumed in case of buildings. Depending on this information, the point on the boundary with minimum distance to the motor vehicle can then be shifted to determine the reference point.

According to an example, also an electronic vehicle guidance system for a motor vehicle may be specified. The electronic vehicle guidance system comprises an environmental sensor system, which may be configured to generate environmental data, which represents surroundings of the environmental sensor system and of the motor vehicle, respectively. The electronic vehicle guidance system comprises a computing unit, which may be configured to determine a region of a field of view of the environmental sensor system concealed by at least one concealing object based on the environmental data. The computing unit may be configured to determine a reference point on a boundary between the concealed region and an unconcealed region of the field of view to determine at least two risk zones with each the reference point as the center, wherein the computing unit may be configured to assign a respective characteristic risk value to each of the two risk zones. The electronic vehicle guidance system comprises a control unit, which may be configured to generate one or more control signals for at least partially automatic control of the motor vehicle depending on the characteristic risk values, which are assigned to the at least two risk zones.

Therein, the control unit can be a part of the computing unit or vice versa. The control unit and the computing unit can also be formed separately from each other.

The at least one control signal can for example be transmitted to one or more actuators of the motor vehicle or of the electronic vehicle guidance system to correspondingly at least partially automatically control the motor vehicle.

According to at least one example of the electronic vehicle guidance system according to the described examples, the environmental sensor system includes a camera system and/or a lidar system and/or a radar system and/or an ultrasonic sensor system.

According to at least one example of the electronic vehicle guidance system, the computing unit may be configured to determine a current risk zone of the at least two risk zones, wherein the position of the motor vehicle may be within the current risk zone and the control unit may be configured to determine the one or the multiple control signals depending on the characteristic risk value assigned to the current risk zone.

According to at least one example, the computing unit may be configured to plan a trajectory for the motor vehicle depending on the at least two risk zones.

Further examples of the electronic vehicle guidance system may directly follow from the different forms of configuration of the method according to the described examples and vice versa. For example, an electronic vehicle guidance system according to the described examples can be configured or programmed to perform a method according to the described examples or performs such a method.

According to an example, a motor vehicle may be specified, which comprises an electronic vehicle guidance system according to the described examples.

According to an example, a computer program with commands may be specified, wherein the commands, upon execution of the commands or of the computer program by an electronic vehicle guidance system according to the described examples, for example by the computing unit of the electronic vehicle guidance system, cause the electronic vehicle guidance system to execute a method according to the described examples.

According to an example, a computer-readable storage medium may also be specified, which stores a computer program according to the described examples.

The computer program as well as the computer-readable storage medium according to the examples can each be understood as a computer program product with the commands.

The examples may also include the combinations of the features of the described examples.

BRIEF DESCRIPTION OF THE DRAWINGS

These and other aspects and advantages will become more apparent and more readily appreciated from the following description of the examples, taken in conjunction with the accompanying drawings of which.

DESCRIPTION

The examples explained in the following are examples of the invention. In the examples, the described components each represent individual features to be considered independently of each other, which also each develop the examples independently of each other and thereby are also to be considered as a constituent of the invention in individual manner or in a combination different from the shown one.

Furthermore, the described examples can also be supplemented by further ones of the already described features of the examples.

In the figures, functionally identical elements are each provided with the same reference characters.

Figure 1:
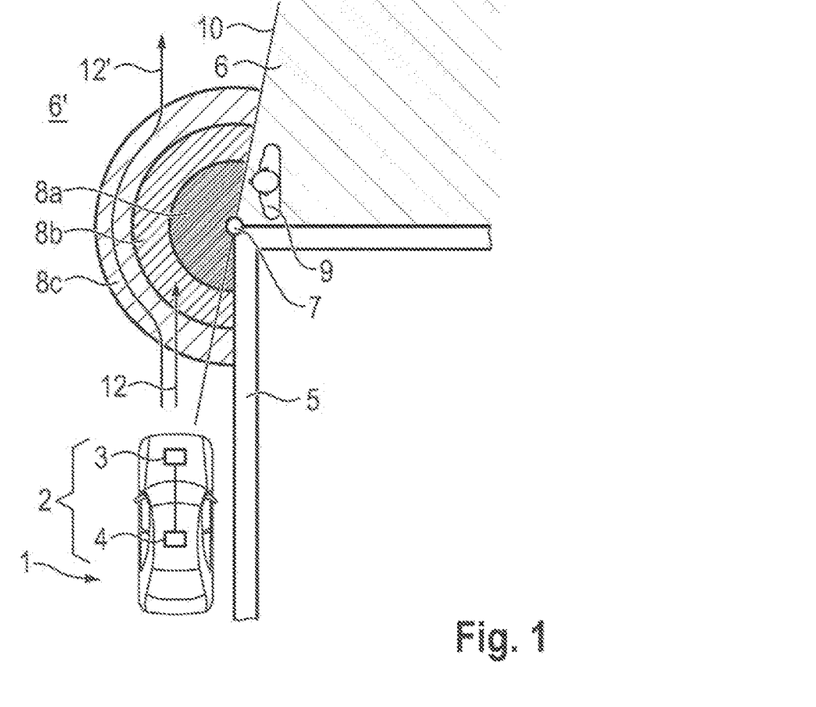
FIG. 1 is a schematic representation of a motor vehicle with an example of an electronic vehicle guidance system according to the improved concept.

In FIG. 1, a motor vehicle 1 is schematically illustrated, which includes an electronic vehicle guidance system 2 according to an example. The vehicle guidance system 2 contains an environmental sensor system 3, for example a camera system, a lidar system and/or a radar system, as well as a computing unit 4 connected to the environmental sensor system 3. The computing unit 4 may for example be a computer processor or a computer that includes a processor, which can for example be configured as an electronic control appliance of the motor vehicle 1 or include such one.

The environmental sensor system 3 generates environmental data to image the surroundings of the motor vehicle 1 and communicates the environmental data to the computing unit 4. In the example situation of FIG. 1, an object 5, for example a building wall, is located in the field of view of the environmental sensor system 3. The environmental data includes corresponding information, which represents the object 5, such that the computing unit 4 can identify a line of sight 10, for example based on a ray model or the like, which separates a region 6 concealed by the object 5 from an unconcealed region 6' of the field of view. In addition, the computing unit 4 is configured to identify a reference point 7 on the line of sight 10, which functions as a center for two or more risk zones 8a, 8b, 8c. The computing unit 4 defines two or more risk zones 8a, 8b, 8c as concentric geometric shapes, for example concentric circles and circular rings, with the reference point 7 as the circle central point or circular ring central point.

In the present, non-restricting example of FIG. 1, the computing unit 4 for example defines a first risk zone 8a, which corresponds to a circle with the reference point 7 as the circle central point, a second risk zone 8b, which corresponds to a circular ring adjoining to the first risk zone 8a, and a third risk zone 8c, which corresponds to a further circular ring adjoining to the second risk zone 8b. In other words, the first risk zone 8a includes the reference point 7, while the second and third risk zones 8b, 8c each have a minimum distance from the reference point 7, which corresponds to an inner radius of the respective circular ring.

A corresponding characteristic risk value is assigned to each of the risk zones 8a, 8b, 8c by the computing unit 4. For example, the characteristic risk value 1 can be assigned to the first risk zone 8a, corresponding to a maximum risk of collision with an object 9 possibly located in the concealed region 6. The characteristic risk value 2 can be assigned to the second risk zone 8b, which represents a risk lower compared to the characteristic risk value 1. A characteristic risk value of 3 can be assigned to the third risk zone 8c, which represents a risk further reduced with respect to the characteristic risk value 2.

In the example of FIG. 1, the reference point 7 can for example correspond to that point on the line of sight 10, which is closest to the motor vehicle 1 and therein still immediately adjoins to the concealed region 6. Here, the reference point 7 is also the location, at which the shortest longitudinal distance of an object from the concealment to the motor vehicle 1 would be if such an object would emerge from the concealment.

The electronic vehicle guidance system 2, for example, a control unit of the electronic vehicle guidance system 2 or of the computing unit 4, generates one or more control signals for at least partially automatic control of the motor vehicle 1 based on the characteristic risk values of the risk zones 8a, 8b, 8c. The control unit may be a computer processor or a computer that includes a processor.

Therein, the motor vehicle 1 can for example be fully automatically controlled, wherein a trajectory 12, 12' of the motor vehicle leads through one or more of the risk zones 8a, 8b, 8c. In such embodiments, the motor vehicle 1 can be moved with a respective speed, which differs from each other in the different risk zones 8a, 8b, 8c. The higher the risk for a potential collision in the corresponding risk zone 8a, 8b, 8c, the lower the speed of the motor vehicle 1. Thus, the motor vehicle 1 can for example enter the third risk zone 8c according to the trajectory 12 indicated by an arrow and reduce the speed to a corresponding speed. If the motor vehicle 1 enters the second risk zone 8b, thus, the speed is further reduced, and it is again further reduced upon entering the first risk zone 8a.

Alternatively or additionally to the speed adaptation, the vehicle could also be guided according to an adapted trajectory 12' such that a larger lateral distance to the concealed region 6 and the reference point 7 can be complied with.

Figure 2:
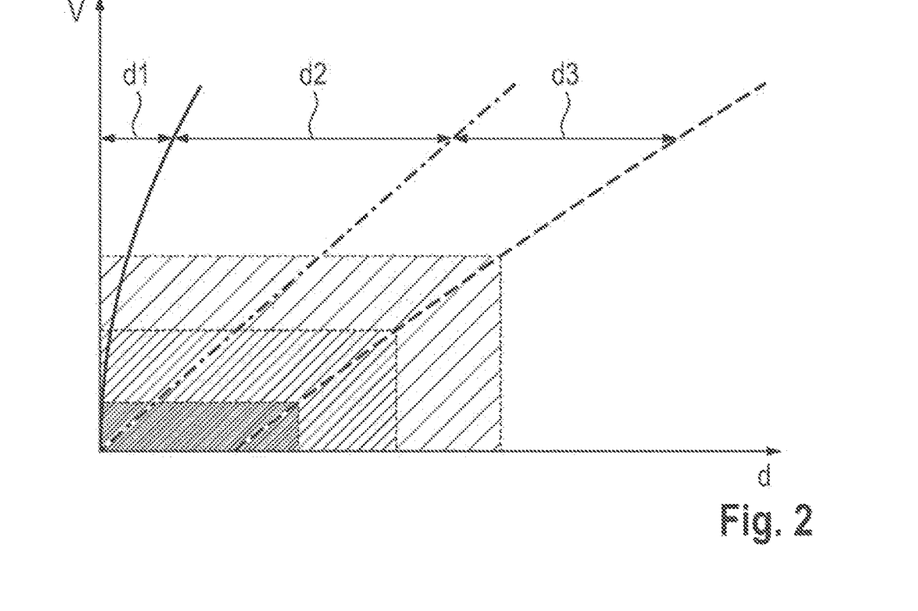
FIG. 2 is a schematic representation for defining vehicle speeds for risk zones according to an example of a method according to the improved concept.

In FIG. 2, a possibility of defining the corresponding speeds for the individual risk zones 8a, 8b, 8c is schematically outlined. On the abscissa, a distance d is plotted in FIG. 2, on the ordinate the speed v of the motor vehicle 1. Further, three curves are drawn in FIG. 2, wherein the left curve represents the braking distance d1 of the motor vehicle 1 as a function of the speed v. The middle curve is a line through origin and for example represents an estimated value for a path d2, which the concealed object 9 would travel during the braking operation of the vehicle 1. The right curve considers the traveled path d3 of the motor vehicle 1 or of the object 9 due to a delay or reaction time. For a given extension of the risk zones 8a, 8b, 8c, for example for a given outer radius, thus, a possible specification for the speed v for the motor vehicle 1 of the corresponding risk zone 8a, 8b, 8c can be determined based on the third curve. However, the determination according to FIG. 2 is not necessarily required and can be replaced with other suitable definitions of the speed for the motor vehicle 1.

Figure 3A:
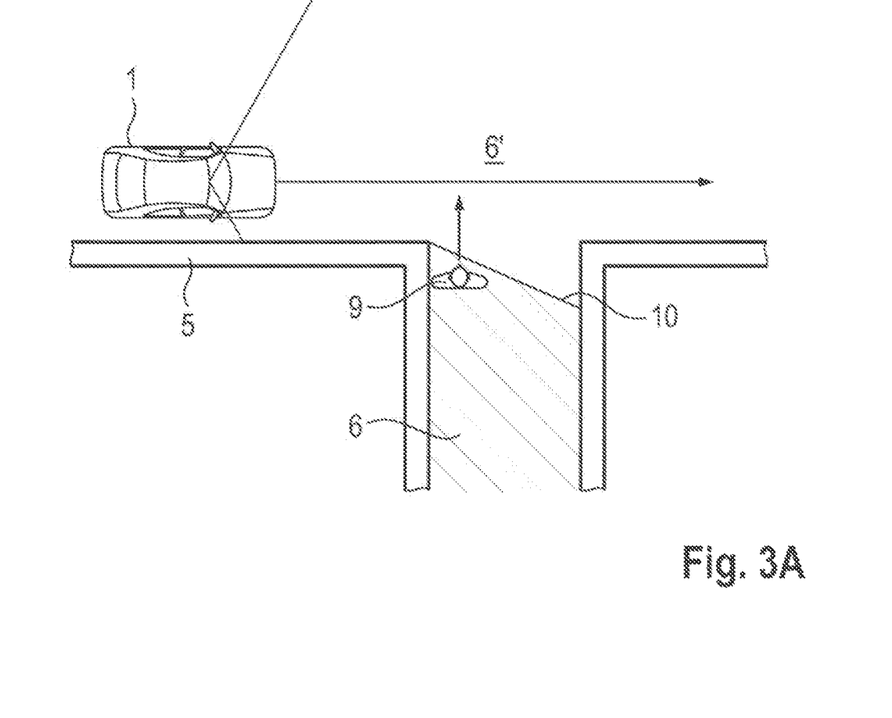
FIG. 3A is a schematic representation of a situation according to a further example of a method according to the improved concept.
Figure 3B:
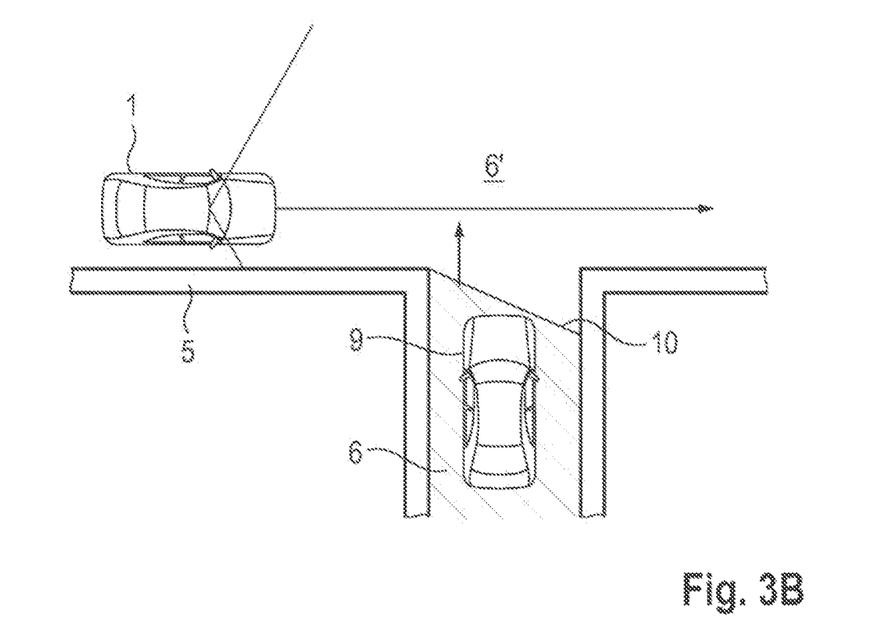
FIG. 3B is a schematic representation of a further situation according to a further example of a method according to the improved concept.
Figure 3C:
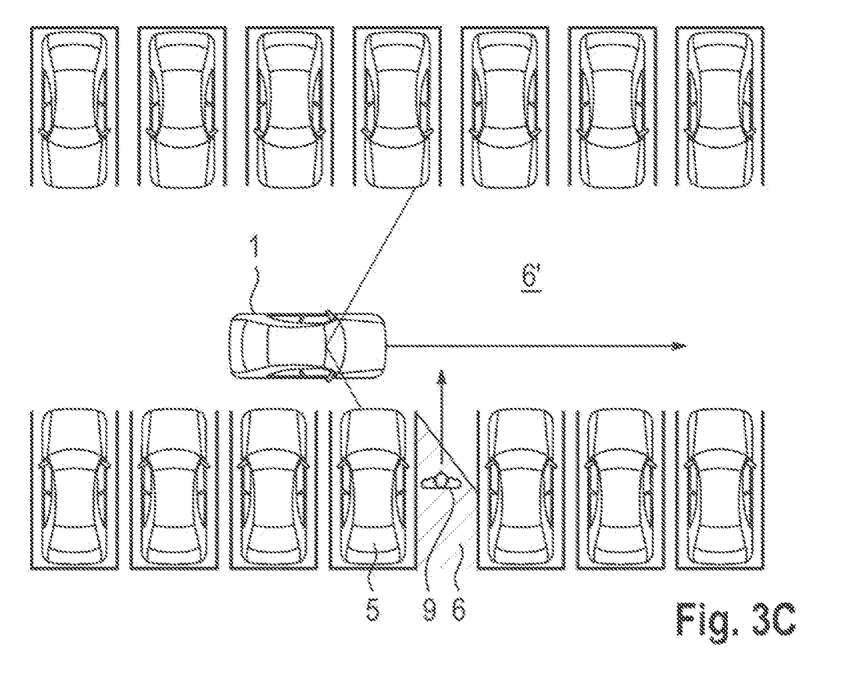
FIG. 3C is a schematic representation of a further situation according to a further example of a method according to the improved concept.

FIG. 3A, FIG. 3B and FIG. 3C each schematically show the motor vehicle 1 in different possible situations, in which the vehicle guidance system 2 according to the described examples and a method according to the described examples, respectively, can be applied. In FIG. 3A, the motor vehicle 1 drives on a road towards a second road joining the road from the right, which is partially concealed by the object 5, and wherein a person 9 is located in the concealed region 6. In FIG. 3B, a similar situation is illustrated, wherein a motor vehicle is located in the concealed region 6, which is about to enter the road, on which the motor vehicle 1 moves. In FIG. 3C, the motor vehicle 1 is on a parking lot, wherein the object 5 is a further motor vehicle, which conceals a region 6 located behind, in which there is for example a person 9.

Figure 4:
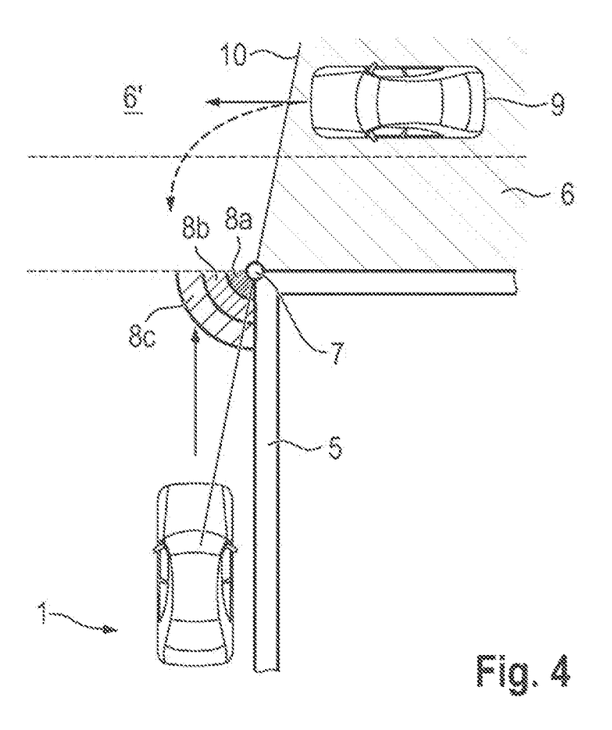
FIG. 4 is a schematic representation of a further situation according to a further exemplary embodiment of a method according to the improved concept.

In FIG. 4, a situation is illustrated, which largely corresponds to that from FIG. 1, wherein the concealed object 9 in FIG. 1 is for example a person, while the concealed object 9 in FIG. 4 is represented as a further motor vehicle. While in case of a person as the concealed object 9, it cannot be excluded that the person is located immediately behind the concealing object 5, this is improbable for the situation of FIG. 4, in particular in case of right-hand traffic. In particular, a further lane can be located between the further motor vehicle 9 of FIG. 4 and the motor vehicle 1, such that the distance between the concealing object 5 and the concealed further motor vehicle 1 is relatively high. The computing unit 4 can retrieve this information relating to the lane for example based on digital map material. By use of this information, the computing unit 4 can reduce the extension of the risk zones 8a, 8b, 8c for example compared to the risk zones 8a, 8b, 8c of FIG. 1, since enough space is still available for decelerating or evading in case of doubt.

Figure 5A:
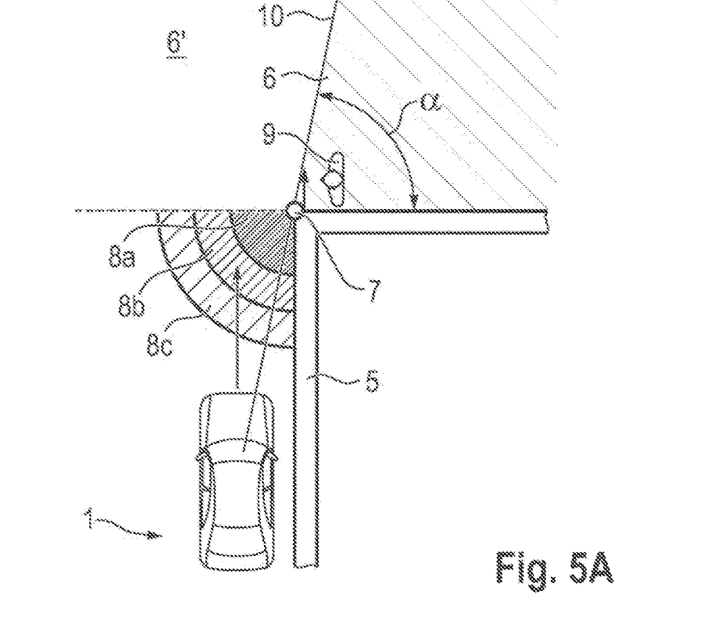
FIG. 5A is a schematic representation of a further situation according to a further example of a method according to the improved concept.
Figure 5B:
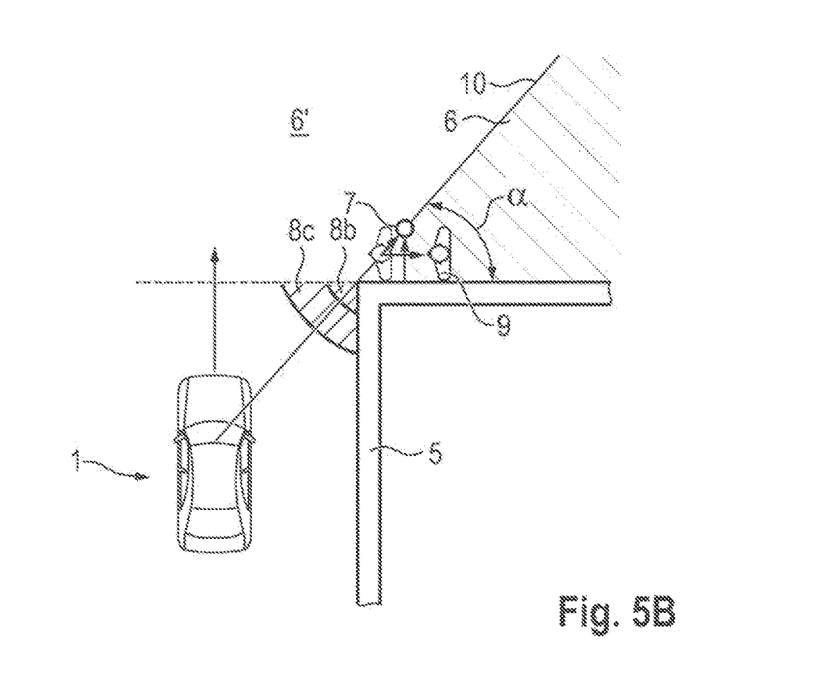
FIG. 5B is a schematic representation of a further situation according to a further example of a method according to the improved concept.
Figure 5C:
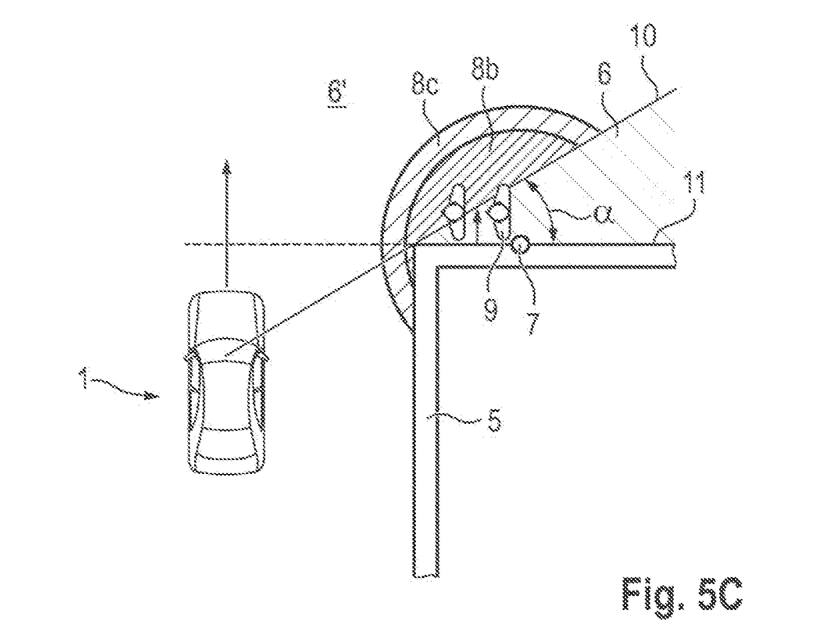
FIG. 5C is a schematic representation of a further situation according to a further example of a method according to the improved concept.

The computing unit 4 can also dynamically change the reference point 7 depending on the position of the motor vehicle 1, as it is schematically illustrated in FIG. 5A to FIG. 5C. Thereto, the computing unit 4 can for example assume a minimum extension of the concealed object 9. The concealed object 9 can for example be imaged based on a so-called bounding box, as it is usual in context of machine perception. If the angle α, which the line of sight 10 includes with the concealing object 5, is known, for example from the map information, thus, a region can be identified, which is concealed, but in which an object with a size, which corresponds to or is larger than the minimum extension, cannot be located without protruding into the unconcealed region 6'. Accordingly, the computing unit 4 can shift the position of the reference point 7 along the line of sight 10, as schematically illustrated in FIG. 5B, such that the influence of the risk zones 8a, 8b, 8c on the control of the motor vehicle 1 is minimized without significantly increasing the risk of a collision.

Alternatively, the position of the reference point 7 cannot be shifted along the line of sight 10, but along a virtual orthogonal 11. Thereto, the computing unit 4 can identify an edge of the concealing object 5 for example based on the environmental data of the environmental sensor system 3. The virtual orthogonal 11 is then in particular orthogonal to the edge.

Alternatively or additionally to the adaptation of the speed of the motor vehicle 1 in passing the risk zones 8a, 8b, 8c, the computing unit 4 can consider the characteristic risk values of the risk zones 8a, 8b, 8c in the trajectory planning for the motor vehicle 1, in particular in case of a fully autonomous motor vehicle 1. In such examples, the characteristic risk values of the risk zones 8a, 8b, 8c can be taken into account via a cost function, which is optimized for planning the trajectory. Thereby, trajectories, which lead through risk zones 8a, 8b, 8c, become the more improbable, the lower the characteristic risk value is, thus the greater the risk for a collision is.

As in particular described with reference to the figures, the described examples allow partially or completely automatically guiding motor vehicles in case of a partially concealed viewing range of the environmental sensor system, wherein the influence of the partial concealment of the viewing range on the control of the motor vehicle can be minimized to increase the driving performance with high safety at the same time. Sight concealments are identified by the environmental sensor system of the motor vehicle itself, in particular depending on the respective vehicle site, and considered in the vehicle guidance, for example in the trajectory planning, for increasing the safety.

By various examples of the improved concept, a particularly high extent of safety may be achieved in that the trajectory for the motor vehicle can be adapted and optionally more distance to the concealed region can be laterally complied with.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide* v. *DIRECTV*, 358 F3d 870, 69 USPQ2d 1865 (Fed. Cir. 2004).

LIST OF REFERENCE CHARACTERS

1 Motor vehicle
2 electronic vehicle guidance system
3 environmental sensor system
4 computing unit
5 concealing object
6 concealed region
6' unconcealed region
7 reference point
8a, 8b, 8c risk zones
9 concealed object
10 line of sight

The invention claimed is:

1. A method to at least partially automatically control a motor vehicle, comprising:
   by an environmental sensor system of the motor vehicle, generating environmental data to represent surroundings of the motor vehicle; and
   by a processor, determining, based on the environmental data, a concealed region of a field of view of the environmental sensor system that is concealed by at least one concealing object by,
      determining a reference point on a boundary between the determined concealed region and an unconcealed region of the field of view, and
      determining at least two risk zones, each risk zone of the at least two risk zones with the reference point as a center of the risk zone, and a respective risk value assigned to each risk zone of the at least two risk zones, so that the motor vehicle is controllable at least partially automatically depending on the respective risk value of each risk zone of the at least two risk zones.

2. The method according to claim 1, wherein,
   the respective risk value is assigned to each risk zone of the at least two risk zones by the processor depending on a respective minimum distance of each risk zone of the at least two risk zones from the reference point.

3. The method according to claim 1, further comprising:
   determining, by the processor, a current risk zone of the at least two risk zones, wherein a position of the motor vehicle is situated within the current risk zone so that the motor vehicle is controllable at least partially automatically depending on the respective risk value assigned to the current risk zone.

4. The method according to claim 3, wherein the motor vehicle is controllable at least partially automatically according to a vehicle speed or vehicle maximum speed depending on the respective risk value of the current risk zone.

5. The method according to claim 1, further comprising:
   planning, by the processor, a trajectory for the motor vehicle depending on the at least two risk zones.

6. The method according to claim 5, further comprising:
   optimizing, by the processor, a cost function based on variations among potential trajectories for the motor vehicle to plan the trajectory,
   the cost function depending on the respective risk value of each risk zone of the at least two risk zones, through which a potential trajectory among the potential trajectories extends.

7. The method according to claim 1, wherein the at least two risk zones are continuously or periodically adapted by the processor depending on a change of a position of the motor vehicle.

8. The method according to claim 1, wherein the reference point is determined as a point on the boundary with minimum distance to the motor vehicle.

9. The method according to claim 1, further comprising:
determining, by the processor, a point on the boundary with a minimum distance to the motor vehicle; and
shifting, by the processor, the point on the boundary with the minimum distance depending on an expectable minimum extension of a potentially concealed object concealed by the at least one concealing object to determine the reference point.

10. The method according to claim 1, further comprising:
reading, by the processor, map information from an electronic map to determine a respective size of each risk zone of the at least two risk zones depending on the map information.

11. An electronic vehicle guidance system, comprising
an environmental sensor system configured to generate environmental data to represent surroundings of the environmental sensor system; and
a first processor configured to,
  determine a concealed region of a field of view of the environmental sensor system that is concealed by at least one concealing object, based on the environmental data,
  determine a reference point on a boundary between the determined concealed region and an unconcealed region of the field of view, and
  determine at least two risk zones, each risk zone of the at least two risk zones with the reference point as a center of the risk zone, and
  assigning a respective risk value to each risk zone of the at least two risk zones; and
a second processor configured to generate at least one control signal to control a motor vehicle at least partially automatically depending on the respective risk value of each risk zone of the at least two risk zones.

12. The electronic vehicle guidance system according to claim 11, wherein the environmental sensor system includes at least one system from among a camera system, a lidar system, a radar system, and an ultrasonic sensor system.

13. The electronic vehicle guidance system according to claim 11, wherein
the first processor is configured to determine a current risk zone of the at least two risk zones with a position of the motor vehicle situated within the current risk zone, and the second processor is configured to determine the at least one control signal depending on the respective risk value assigned to the current risk zone; and/or
the first processor is configured to plan a trajectory for the motor vehicle depending on the at least two risk zones.

14. A motor vehicle with an electronic vehicle guidance system according to claim 11.

15. A non-transitory computer readable medium with stored commands, which, upon execution by the first processor of the electronic vehicle guidance system according to claim 11, cause the electronic vehicle guidance system to execute a method comprising:
generating environmental data to represent surroundings of the motor vehicle; and
determining, based on the environmental data, a concealed region of a field of view of the environmental sensor system that is concealed by at least one concealing object by,
  determining a reference point on a boundary between the determined concealed region and an unconcealed region of the field of view, and
  determining at least two risk zones, each risk zone of the at least two risk zones with the reference point as a center of the risk zone, and a respective risk value assigned to each risk zone of the at least two risk zones, so that the motor vehicle is controllable at least partially automatically depending on the respective risk value of each risk zone of the at least two risk zones.

* * * * *